United States Patent Office 2,954,368
Patented Sept. 27, 1960

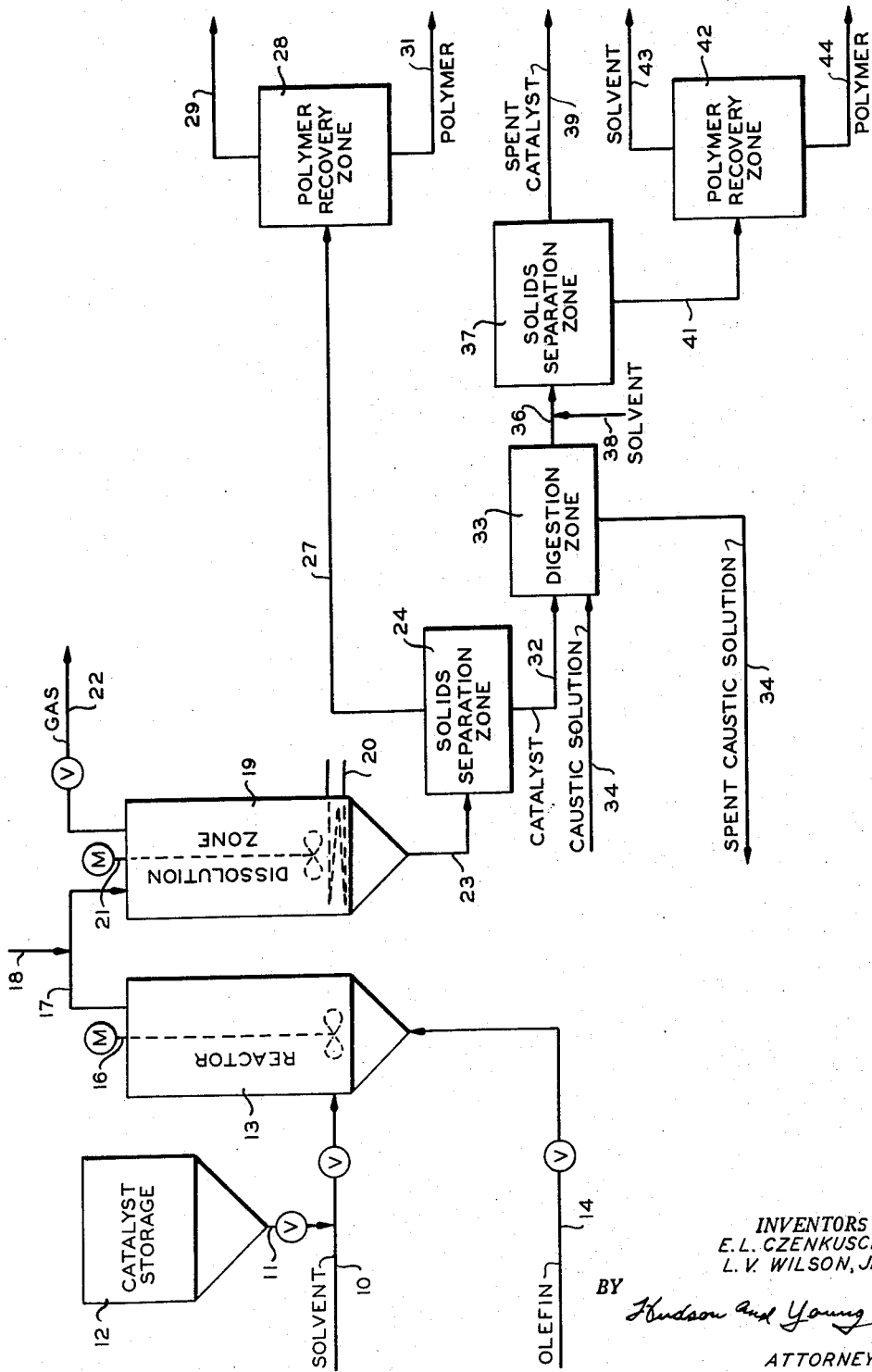

2,954,368

RECOVERY OF POLYMER

Edward L. Czenkusch and Lawrence V. Wilson, Jr., Bartlesville, Okla., assignors to Phillips Petroleum Company, a corporation of Delaware Filed Nov. 19, 1956, Ser. No. 623,218

12 Claims. (Cl. 260—93.7)

This invention relates to the recovery of polymer. In one aspect, it relates to a method for recovering polymer associated with the solid catalyst employed in a polymerization process.

Recently, considerable attention has been directed to the production of solid polymers, e.g., polymers of ethylene and/or propylene employing a chromium oxide containing catalyst as described in the copending U.S. patent application of J. P. Hogan and R. L. Banks, Serial No. 573,877, filed March 26, 1956, now Patent No. 2,825,721. The solid polymers and copolymers so produced have utility in applications where solid plastics are used. For example, they can be extruded to form filaments and film, or they can be molded to form articles of any desired shape, such as bottles, containers, pipe, and the like. Since the polymers recovered from the reactions are often in the form of solutions thereof in liquid solvents, it becomes necessary to provide for the removal of the suspended catalyst. The separation of catalyst from the polymer solution can usually be accomplished by any suitable separation means, e.g., a centrifuge, a filter, or other known equipment for the removal of solids from liquids. The catalyst so separated has associated therewith a considerable amount of polymer which is often lost to the process, e.g., as a result of subsequent regeneration of the catalyst or through actual discard of the catalyst.

It is an object of this invention, therefore, to provide a method for recovering the polymer associated with the solid catalyst after its employment in a polymerization process.

Another object of the invention is to provide a method for recovering polymer having a molecular weight higher than that of the polymer usually produced during the polymerization.

A further object of the invention is to provide a method for increasing the ultimate yield of polymer obtainable in an olefin polymerization process.

Other and further objects and advantages of the invention will become apparent to those skilled in the art upon consideration of the accompanying disclosure and the drawing, which is a flow diagram illustrating one embodiment of the instant invention.

In polymerizations carried out in the presence of solid catalysts using a liquid solvent as the reaction medium, the recovered polymer solution contains catalyst particles which in some cases it is desirable to remove. The catalyst so separated has polymer associated therewith, either deposited in the pores or on the surface of the catalyst, which is not recovered by the usual methods of solids-liquid separation. The polymer so associated with the catalyst has in general a higher molecular weight than the polymer contained in the recovered polymer solution and does not go into solution in the liquid solvent employed as the reaction medium in the polymerization. The instant invention resides broadly in treating the catalyst having high molecular weight polymer associated therewith with an alkali metal hydroxide so as to make possible recovery of the polymer. In one embodiment, the process of the invention comprises digesting a solid polymerization catalyst containing polymer in a caustic solution, particularly, an aqueous alkali metal hydroxide solution, and thereafter recovering the polymer from the digested catalyst or digestion residue. The terms "digested catalyst" and "digestion residue" as used herein refer to the catalyst and associated polymer after treatment of the catalyst with an aqueous alkali metal hydroxide solution.

In a more specific embodiment, the process of this invention comprises digesting spent solid polymerization catalyst in an aqueous alkali metal hydroxide solution at a temperature of at least 150° F., more desirably at temperature of at least 200° F., for a period of at least 30 minutes, separating the digested catalyst from the solution, treating the digested catalyst with a solvent for the polymer associated with the catalyst, thereby dissolving the polymer in the solvent, recovering the resulting polymer solution, and recovering polymer from the polymer solution.

The present invention is broadly applicable to the recovery of polymer from solid polymerization catalyst, particularly catalysts comprising metal compounds supported on an oxide base, having polymer associated therewith. However, the invention is especially applicable to the recovery of polymer from catalyst described in the above-mentioned copending U.S. patent application of J. P. Hogan and R. L. Banks. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and the contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range of 150 to 450° F. The pressure can range from approximately atmospheric to as high as 1000 p.s.i.

A satisfactory method of conducting the polymerization comprises contacting an olefin with a slurry of catalyst in a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i.. When a solvent is so used, the reaction effluent comprises a mixture of solvent and polymer and contains finely divided suspended catalyst. As previously mentioned, any suitable separation means can be employed to effect the removal of the catalyst from the polymer solution. The present invention is concerned with the recovery of the polymer which is associated with the catalyst recovered in such a separation.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above-defined general class is constituted by those naphthenic hydrocarbons having from 5 to 6 carbon atoms in a single ring and from 0 to 2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

A more complete understanding of the invention may be obtained by referring to the drawing which is a flow diagram illustrating a preferred embodiment of the invention. While the invention will be discussed with relation to the polymerization of ethylene using cyclohexane as the solvent, it is to be understood that it is not intended to limit the invention to any particular polymerization process. As previously indicated, the invention is broadly applicable to the separation of polymer associated with solid catalysts employed in polymerization processes.

As shown in the drawing, a suitable solvent, such as cyclohexane, enters the system through inlet line 10. A catalyst, which preferably has a particle size in the range of about 40 to 100 mesh, is added to the solvent by means of line 11 connecting catalyst storage tank 12 to line 10. The slurry of catalyst and solvent which is thus formed is then pumped into reactor 13. The catalyst can be, for example, a chromium oxide-silica-alumina catalyst, prepared by impregnating 90 weight percent silica and 10 weight percent alumina gel composition with chromium trioxide, drying and heating in air to obtain a catalyst composition containing approximately 2.5 weight percent chromium in the form of chromium oxide of which approximately one-half is in the form of hexavalent chromium.

An olefin, such as ethylene, enters the system through inlet line 14 and is intimately contacted with the catalyst slurry in reactor 13. A suitable stirring means 16, driven by a motor, is provided to facilitate contacting and to maintain the catalyst in suspension in the reaction medium. The reaction zone can be maintained, for example, at 275° F. and 500 p.s.i. with the reaction time ranging from about 15 minutes to about 10 hours. The reactor effluent which is recovered through line 17 comprises a mixture of polymer, solvent, suspended catalyst and small amounts of unreacted ethylene. Additional solvent can be added to line 17 by means of line 18, if desired, in order to obtain a mixture having a suitable viscosity for transfer through the system. The concentration of polymer is ordinarily adjusted to a value in the range from about 1 to about 15 percent, based on polymer plus solvent. The resulting mixture is passed into dissolution zone 19 wherein the mixture is heated by a heating means, such as heating coil 20, and agitated by means of stirring means 21 to insure complete solution of polymer in the solvent. The dissolution zone is generally maintained at a temperature from 25 to 50° F. higher than the temperature within reactor 13, a suitable temperature ordinarily being approximately 300 to 325° F. The pressure in dissolution zone 19 is ordinarily lower than that in reactor 13, for example about 75 to 150 p.s.i. lower, but it is still high enough to maintain the solvent in the liquid phase. The increased temperature and the reduced pressure can be utilized to remove any unreacted ethylene or other gas, which can be withdrawn through outlet line 22.

The resulting solution containing suspended catalyst is removed from dissolution zone 19 by means of line 23 and then passed into solids separation zone 24. The solids separation zone can comprise any equipment suitable for separating solids from liquid materials, such as a filter, centrifuge or the like. A particularly desirable method for effecting removal of catalyst from the polymer solution is disclosed by L. B. Croley and G. E. Hanson in copending U.S. patent application Serial No. 527,310, filed March 19, 1956, now abandoned. As described in more detail in the Croley and Hanson application, the polymer solution containing suspended catalyst is cooled in a cooling zone to a temperature somewhat above the lower cloud point of the polymer solution, e.g., to a temperature between 0 and 50° F., preferably between 10 and 25° F., above the lower cloud point. As a result of cooling the polymer solution in this manner, a minor proportion of the polymer precipitates from solution, thereby agglomerating the suspended solids. Sufficient agitation is provided in the cooling zone to prevent the polymer which precipitates as a result of the cooling from settling and to assist in the agglomeration of the catalyst particles. The resulting slurry of agglomerated catalyst containing solid polymer is then passed to a liquid-solids separation zone, such as a settling tank, a cyclone separator, a centrifuge, a filter or the like, wherein a substantially catalyst-free solution containing a major proportion of the polymer product is recovered. The catalyst recovered from this liquid-solids separation zone has polymer associated therewith, which is insoluble in the solvent and has a higher molecular weight than the polymer in solution. By treating the catalyst as described in detail hereinafter, it becomes possible to recover the polymer by thereafter contacting the treated catalyst with a suitable hydrocarbon solvent.

The essentially catalyst-free polymer solution recovered from solids separation zone 24 by means of line 27 contains a major proportion of the polymer product. This solution is then passed into polymer recovery zone 28 which can be any suitable means for recovering polymer from a solution thereof in a solvent. For example, zone 28 can comprise a series of evaporation steps as described in more detail in the copending U.S. patent application of Martin R. Cines, Serial No. 496,515, filed March 24, 1955. The zone can also comprise cooling and filtration equipment whereby the dissolved polymer is precipitated from solution by cooling the solvent to a temperature below the lower cloud point and subsequently filtering. Solvent recovered from zone 28 through line 29 can be recycled to solvent inlet line 10. A polymer product which has a lower average molecular weight than that of the polymer associated with the catalyst is recovered through outlet line 31.

Catalyst having polymer associated therewith, which is recovered from solids separation zone 24 through line 32, is then passed into digestion zone 33. Prior to introduction into zone 33, the catalyst may be treated, as by steam stripping, to remove any solvent. In the digestion zone, the catalyst is digested in an aqueous caustic solution which is introduced into the zone by means of line 34. An aqueous solution of any of the alkali metal hydroxides, e.g., sodium hydroxide or potassium hydroxide, can be employed in the practice of the instant invention. The concentration of caustic in the solution can vary within rather wide limits, e.g., from 0.5 to 30 weight percent and higher; however, a concentration of caustic in the approximate range of 1 to 20 weight percent is usually preferred, with a concentration between 5 and 20 weight percent even more desirable. The treatment of the catalyst with the caustic solution preferably occurs at a temperature of at least 150° F. and more desirably at a temperature of at least 200° F. However, it is to be understood that even lower temperatures can be employed although at the lower temperatures a longer digestion period is required than when operating at more elevated temperatures. Furthermore, it is within the purview of the invention to employ temperatures above the boiling point of the caustic solution in which case it becomes necessary to carry out the treatment of the catalyst under pressure. A digestion period of at least 30 minutes is generally required, it being understood that this period is dependent to a large extent upon the temperature at which the digestion is conducted. Thus, at lower digestion temperatures, e.g., around 150° F., periods as long as 12 hours is sometimes required whereas at higher temperatures, e.g., around 215° F., periods of 4 hours or less is often sufficient to accomplish the desired treatment of the catalyst. After the catalyst has been treated with the caustic solution, the spent caustic solution is separated from the treated catalyst by any suitable separation means, such as by decantation or filtration. The spent caustic solution so separated is withdrawn from the digestion zone by means of line 34. The digested catalyst, which is recovered from the digestion zone through line 36, preferably after washing with water to remove all traces of caustic, is passed into solids separation zone 37. Line 38 connected to line 36 provides means for introducing a solvent into the latter line so as to facilitate flow of catalyst between zones 33 and 37. The solvent supplied through line 38 is also employed in zone 37 to dissolve the polymer associated with the catalyst.

In the solids-separation zone 37, the slurry of digested catalyst in solvent is heated to a temperature sufficient to dissolve the polymer associated with the catalyst in the solvent. Any suitable solvent, as described herein, can be used; however, it is preferred to employ an aromatic, such as toluene or xylene, since the polymer is more soluble in this type of solvent. In general, the catalyst and solvent are heated to about the boiling point of the solvent, which in the case of toluene is about 230° F. The resulting polymer solution is thereafter separated from the catalyst by any suitable separation means, such as a filter or centrifuge. It is also within the scope of the invention to separate the catalyst by the method described in the above-mentioned Croley and Hanson application. When proceeding in accordance with this method with toluene as the solvent, the polymer solution containing catalyst is cooled while being agitated to a temperature between about 200 and 210° F. As a result of cooling the polymer solution, a small amount of the polymer in solution precipitates, thereby causing the catalyst particles to agglomerate. The polymer solution can then be readily separated from the catalyst particles by decantation, filtration, or other suitable means. The spent catalyst separated from the polymer solution in this manner is recovered from solids separation zone 37 by means of line 39. This catalyst can be regenerated for subsequent use in the polymerization, or it can be discarded. It is also within the purview of the invention to subject the spent catalyst to further treatment by digesting the catalyst in an aqueous caustic solution and then contacting the digested catalyst with a solvent as described above. By proceeding in this manner, still additional polymer can be recovered. Although a third or even more digestions can be carried out, no more than two are usually employed.

The polymer solution which is recovered from solids separation zone 37 through line 41 is then passed into polymer recovery zone 42 wherein the polymer is separated from the solvent. Polymer recovery zone 42 can be similar to zone 28 which has been described hereinbefore. The solvent is recovered from zone 42 through line 43 while a polymer product is recovered from this zone by means of line 44. The solvent so recovered from zone 42 can be recycled to line 38 for use in the separation of the polymer from the catalyst. The polymer which is recovered by means of line 44 has a substantially higher molecular weight than the polymer product recovered from zone 28 through line 31.

A more complete understanding of the invention can be obtained by referring to the following illustrative examples which are not intended, however, to be unduly limitative of the invention.

EXAMPLE I

Polyethylene was produced by polymerizing ethylene in the presence of a 40 to 100 mesh catalyst prepared by impregnating a 90 weight percent silica-10 weight percent alumina coprecipitated gel composite with an aqueous solution of chromium trioxide, drying and heating for several hours in a stream of anhydrous air at about 950° F. The polymerization was conducted by contacting a mixture of ethylene and cyclohexane with the catalyst in the form of a slurry in cyclohexane at a temperature of about 290° F. and a pressure of about 450 p.s.i.g. The reaction mixture recovered from the polymerization comprised polymer, cyclohexane, catalyst, and unreacted ethylene. This mixture was then passed into a dissolution zone wherein the mixture was heated to about 300° F. and the unreacted ethylene was flashed off. Thereafter, the reaction mixture was passed through a Vallez filter to remove the catalyst from the mixture. A polymer solution substantially free of catalyst was recovered from the filter and subsequently passed to a polymer recovery zone from which a solid polymer having a molecular weight of about 45,000 was recovered. Catalyst and filter aid which was also recovered from the Vallez filter was steam stripped in order to remove any cyclohexane contained therein and a resulting slurry of catalyst and filter aid in water was then introduced into a cyclone separator. In the cyclone separator, catalyst was separated from the filter aid.

The catalyst recovered from the cyclone separator was then washed with boiling toluene (231° F.) in order to remove any soluble polymer which might have been present. The catalyst thereafter was separated from the toluene by lowering the temperature of the toluene to between 200 and 210° F., thereby causing the catalyst to agglomerate, and then removing the toluene by decantation. The catalyst and associated polymer was then digested at 215° F. in an excess of 20 percent sodium hydroxide solution. After a digestion period of about 4 hours, the caustic was removed by decantation and the digestion residue was washed with water to remove any traces of caustic. Thereafter, the digestion residue was placed in boiling toluene to dissolve the polymer associated with the catalyst. The resulting polymer solution was separated from the catalyst by lowering the temperature of the solution to between 200 and 210° F., thereby causing the catalyst to agglomerate and then removing the polymer solution by decantation. After recovery of the polymer solution, polymer was recovered therefrom by flashing off the toluene. The data obtained during this run are set out below in Table I.

*Table I*

| | |
|---|---|
| Polymer content of catalyst prior to digestion, weight percent | 49.5 |
| Weight ratio NaOH/catalyst and associated polymer (charge basis) | 5.0 |
| Polymer recovered, weight percent of charge polymer | 37.8 |
| Properties of recovered polymer: | |
|     Molecular weight (based on inherent visc.) | 72,500 |
|     Ash content, weight percent | 4.2 |
| Spent catalyst (after removal of polymer) ash content, weight percent | 25.3 |

EXAMPLE II

A sample of the same catalyst material used in Example I, which had been treated as described in that example to remove any soluble polymer deposited thereon, was digested with a 20 percent sodium hydroxide solution at 215° F. in two stages. That is, the digestion residue recovered after a first digestion with the caustic solution was then washed with boiling toluene and the polymer recovered as described in Example I. The catalyst recovered from the polymer solution was then digested in a second 20 percent sodium hydroxide solution after which the digestion residue was washed with boiling xylene and the polymer recovered as described in Example I. The digestion period for each of the two stages was about 4 hours. The data obtained during this two stage treatment of the catalyst are shown hereinbelow in Table II.

*Table II*

|  | Two-Stage Digestion | |
|---|---|---|
|  | First Stage | Second Stage |
| Polymer content of catalyst prior to digestion, percent | 43.4 |  |
| Weight ratio NaOH/catalyst and associated polymer (Charge basis) | 11.9 | 6.0 |
| Soluble polymer recovered, weight percent of charge polymer | 29.5 | 17.0 |
| Properties of recovered polymer: |  |  |
| Molecular weight (viscosity) | 63,900 | 71,700 |
| Density, grams/cc. at room temperature | 0.952 | 0.969 |
| Melting point, ° F | 251±2 | 250±2 |
| Ash content, weight percent | 1.37 | 1.66 |
| Spent catalyst: Ash content, weight percent |  | 28.5 |

EXAMPLE III

A series of runs were made in order to determine the effect of caustic concentration. In each of these runs, a catalyst containing polymer which had been treated with toluene as described in Example I to remove soluble polymer was digested in sodium hydroxide solutions of different concentrations. After each digestion, which were for a period of four hours at a temperature of 215° F., the caustic was removed by decantation. An ash content determination was then made on each of the digestion residues. The results of the determinations and the different caustic concentrations are set forth hereinbelow in Table III.

*Table III*

| Run No. | Weight Ratio NaOH/Catalyst | Caustic Solution, Weight Percent NaOH | Ash Content, Weight Percent |
|---|---|---|---|
| Catalyst charge to digestion |  |  | 54.7 |
| 1 | 9.2 | 20 | 24.5 |
| 2 | 4.5 | 10 | 22.9 |
| 3 | 2.2 | 5 | 27.8 |
| 4 | 0.5 | 1 | 35.6 |

The catalyst which was used in the polymerization described in Example I contained about 2.5 weight percent chromium oxide, calculated as chromium. When a catalyst is employed which contains a higher percentage of chromium oxide, the amount of caustic used in the treatment of the catalyst containing polymer can be decreased while still obtaining comparable results.

The digested catalyst from run No. 3 was further treated to recover the polymer freed by the digestion. This was accomplished as described hereinbefore in Example I by dissolving the polymer in boiling toluene after which the temperature of the solution was lowered to between 200 and 210° F. The polymer solution was then recovered by decantation after which the toluene was flashed from the polymer solution. The polymer recovered had a molecular weight of approximately 70,000. The ash content of the catalyst material remaining after separation of the polymer solution was 31.3 weight percent.

From the foregoing, is seen that a method is provided whereby polymer which is associated with solid catalyst as a result of use in polymerization processes is readily recovered as an additional product. Since the polymer associated with the catalyst is generally lost to the process, recovery of the polymer as described herein results in a substantial increase in the ultimate yield of polymer product. It will be apparent to those skilled in the art that variations and modifications of the invention can be made from a study of the foregoing disclosure. Such variations and modifications are believed to be clearly within the spirit and scope of the invention.

We claim:

1. A process for treating a polymerization catalyst comprising metal compounds supported on an oxide base, said catalyst having a polymer of an aliphatic 1-olefin of 2 to 8 carbon atoms per molecule associated therewith, which comprises digesting said catalyst in an aqueous alkali metal hydroxide solution; separating the resulting digested catalyst from said solution; contacting said digested catalyst with a solvent for the polymer associated therewith so as to dissolve said polymer in said solvent; and recovering the resulting polymer solution.

2. A process for treating solid polymerization catalyst having a polymer of an aliphatic 1-olefin of 2 to 8 carbon atoms per molecule associated therewith which comprises digesting said catalyst in an aqueous alkali metal hydroxide solution; separating the resulting digested catalyst from said solution; contacting said digested catalyst with a solvent for the polymer associated with said catalyst, thereby dissolving said polymer in said solvent; recovering the resulting polymer solution; and separating polymer from said polymer solution.

3. The process of claim 2 in which said catalyst is digested at a temperature of at least 150° F. and for a period of at least 30 minutes.

4. The process of claim 2 in which said solution is a sodium hydroxide solution.

5. The process of claim 2 in which said solution is a potassium hydroxide solution.

6. The process of claim 2 in which the concentration of alkali metal hydroxide in said solution is in the range of 0.5 to 30 weight percent.

7. The process of claim 2 in which the concentration of alkali metal hydroxide in said solution is in the range of 1 to 20 weight percent.

8. A process for treating a polymerization catalyst comprising chromium oxide supported on at least one oxide selected from the group consisting of silica, alumina, zirconia and thoria, said catalyst having a polymer of an aliphatic 1-olefin of 2 to 8 carbon atoms associated therewith, which comprises digesting said catalyst in an aqueous alkali metal hydroxide solution at a temperature of at least 150° F. and for a period of at least 30 minutes, the concentration of said alkali metal hydroxide solution being in the range of 0.5 to 30 weight percent, separating the resulting digested catalyst from said solution; mixing said digested catalyst with a solvent for the polymer associated with said catalyst, thereby dissolving said polymer in said solvent; recovering the resulting polymer solution; and separating polymer from said polymer solution.

9. The process of claim 8 in which said digested catalyst is mixed with an aromatic hydrocarbon at a temperature sufficient to dissolve a substantial amount of said polymer associated with said catalyst; the resulting polymer solution is cooled to a temperature at which a minor proportion of the polymer precipitates from solution, thereby agglomerating said catalyst; said polymer solution is separated from said agglomerated catalyst; and polymer is separated from said polymer solution.

10. The process of claim 9 in which said aromatic hydrocarbon is toluene.

11. The process of claim 9 in which said aromatic hydrocarbon is xylene.

12. A process for treating a polymerization catalyst comprising a metal compound supported on an oxide base, said catalyst having a polymer of an aliphatic 1-olefin of 2 to 8 carbon atoms per molecule associated therewith, which comprises initially contacting said catalyst with a hydrocarbon solvent; separating said catalyst from said solvent; digesting said separated catalyst in an aqueous alkali metal hydroxide solution at a temperature of at least 150° F. and for a period of at least 30 minutes, the concentration of said alkali metal hydroxide solution being in the range of 0.5 to 30 weight percent; separating the resulting digested catalyst from said solution; contacting said digested catalyst with a hydrocarbon solvent so as to dissolve said polymer associated with said catalyst in said solvent; recovering the resulting polymer solution; and separating polymer from said solution.

References Cited in the file of this patent

UNITED STATES PATENTS

| | | |
|---|---|---|
| 1,904,218 | Franceway | Apr. 18, 1933 |
| 2,253,871 | Semon | Aug. 26, 1941 |
| 2,287,535 | Powers | July 23, 1942 |
| 2,391,293 | Carmody | Dec. 18, 1945 |
| 2,451,047 | Skooglund | Oct. 12, 1948 |
| 2,529,236 | Hart et al. | Nov. 7, 1950 |
| 2,734,892 | Carter | Feb. 14, 1956 |
| 2,825,721 | Hogan et al. | Mar. 4, 1958 |
| 2,838,477 | Roelen et al. | June 10, 1958 |